US005548532A

United States Patent [19]
Menand et al.

[11] Patent Number: 5,548,532
[45] Date of Patent: *Aug. 20, 1996

[54] APPARATUS AND METHOD FOR FORMULATING AN INTERACTIVE TV SIGNAL

[75] Inventors: Jean-René Menand, Marina Del Rey, Calif.; Kuriacose Joseph, Plainsboro; Ansley W. Jessup, Jr., Willingboro, both of N.J.

[73] Assignee: Thomson Consumer Electronics, Inc., Indianapolis, Ind.

[*] Notice: The term of this patent shall not extend beyond the expiration date of Pat. No. 5,448,568.

[21] Appl. No.: 234,773

[22] Filed: Apr. 28, 1994

[51] Int. Cl.[6] .............................. H04J 3/24; H04B 1/66; H04N 7/52
[52] U.S. Cl. ................ 364/514 C; 370/112; 370/118; 348/384
[58] Field of Search ..................... 364/514 A, 514 B, 364/514 C, 514 R; 370/112, 118; 375/240; 348/384

[56] References Cited

U.S. PATENT DOCUMENTS

| 3,803,491 | 4/1974  | Osborn ............................ 325/53 |
| 3,891,792 | 6/1975  | Kimura ........................... 178/5.8 R |
| 4,264,925 | 4/1981  | Freeman et al. .................. 358/86 |
| 4,323,922 | 4/1982  | den Toonder et al. ........... 358/117 |
| 4,528,589 | 7/1985  | Block et al. ..................... 358/122 |
| 4,965,825 | 10/1990 | Harvey et al. .................... 380/9 |
| 5,168,356 | 12/1992 | Acampora et al. .............. 358/133 |
| 5,191,573 | 3/1993  | Hair ................................. 369/84 |
| 5,299,197 | 3/1994  | Schlafly ........................... 370/94.1 |
| 5,343,238 | 8/1994  | Lappington et al. ............. 348/12 |
| 5,347,632 | 9/1994  | Filepp et al. .................... 395/200 |
| 5,448,568 | 9/1995  | Delpuch et al. ................. 372/94.2 |

Primary Examiner—Emanuel T. Voeltz
Assistant Examiner—Patrick J. Assouad
Attorney, Agent, or Firm—Joseph S. Tripoli; Eric P. Herrmann; Ronald H. Kurdyla

[57] ABSTRACT

Apparatus and a method for formatting executable codes and data, defining interactive applications, with video and audio program material, for reliable and convenient access includes compressing (18, 21) audio and video programs according to a protocol such as MPEG. The compressed audio and video (A/V) programs are segmented (19, 22) into transport packets, with audio transport packets identified by a first service identifier $SCID_{Ai}$, and video transport packets identified by a second service identifier, $SCID_{Vi}$. Interactive application programs associated with A/V programs are compiled (10) into functional modules and condensed. A module may be executable software or data. A module includes code/data and a header. The code/data portion of each module undergoes cyclic redundancy coding (CRC) over the entire module and CRC check bits are concatenated or appended to the module. Respective modules are segmented (14) into transport packets. The code/data transport packets are identified by a third service identifier $SCID_{Di}$. The transport packets are formed into transmission units comprising an integer number of code/data transport packets and a header transport packet. A special directory module is generated (10) which interrelates the modules incorporated in an application program. Video packets, audio packets and module packets are subsequently time division multiplexed (16) for transmission.

22 Claims, 8 Drawing Sheets

TABLE I

| BITS | FUNCTION |
|---|---|
| 16 | MODULE ID |
| 32 | TOTAL BYTES IN MODULE INCLUDING CRC |
| 32 | MODULE VERSION NUMBER |
| 32 | MODULE TRANSMISSION UNIT BYTE OFFSET |
| 32 | LENGTH (BYTES) OF TRANSMISSION UNIT |

FIG. 5

TABLE II

| BITS | FUNCTION |
|---|---|
| 32 | APPLICATION IDENTIFIER (AID) |
| 32 | DECODER MEMORY REQUIREMENTS FOR APPLICATION |
| 16 | TOTAL MODULE COUNT |
| | for each module |
| 16 | POINTER TO MODULE STRING TABLE |
| 16 | MODULE IDENTIFIER |
| 32 | MODULE VERSION NUMBER |
| 32 | LENGTH OF MODULE INCLUDING CRC |
| 32 | DECODER MEMORY REQUIREMENTS (IF CODE MODULE) |
| 32 | OTHER FLAGS |
| XX | STRING TABLE FOR MODULE NAMES, STRINGS ARE NULL TERMINATED |

FIG. 6

APPLICATION

DIRECTORY MODULE   CODE MODULE   DATA MODULE

*FIG. 7*

APPARATUS AND METHOD FOR FORMULATING AN INTERACTIVE TV SIGNAL

This invention relates to a system for composing a signal to be transmitted from for example a satellite, which signal includes video, audio, and interactive signals components as for interactive television.

BACKGROUND

Interactive television (TV) systems are known from for example U.S. Pat. No. 5,233,654. The system described in the '654 patent includes a receiver having a computer with sufficient storage to store interactive programs, albeit that provision is made to alter the programs with transmitted data. In order to make interactive TV less costly and therefore more attractive to consumer acceptance, it is desirable to keep memory in the receiver to a minimum. This may be achieved by regularly transmitting executable code for the desired applications, rather than requiring that the applications be continuously stored in the receiver. In effect the transmission media is utilized as a mass storage device.

SUMMARY OF THE INVENTION

The present invention is directed toward formatting executable codes and data, defining interactive applications, with video and audio program material, for reliable and convenient access. The method includes compressing audio and video programs according to a protocol such as MPEG. The compressed audio and video (A/V) programs are then segmented into transmission or transport packets, with audio transport packets identified by a first service identifier $SCID_{Ai}$, and video transport packets identified by a second service identifier, $SCID_{Vi}$. Interactive application programs associated with A/V programs are compiled into functional modules and condensed. A module may be executable software or data. A module includes code/data and a header. The code/data portion of each module undergoes cyclic redundancy coding (CRC) over the entire module and CRC check bits are concatenated or appended to the module. Respective modules are segmented into transport packets. The code/data transport packets are identified by a third service identifier $SCID_{Di}$. The transport packets are formed into transmission units comprising an integer number of code/data transport packets and a header transport packet. A special directory module is generated which includes information for informing a receiver device of the modules incorporated in an application program. Video packets, audio packets and module packets are subsequently time division multiplexed for transmission.

BRIEF DESCRIPTION OF THE DRAWINGS

A detailed description of the invention is provided below with reference to the drawings wherein:

FIG. 5 is a table indicating representative contents of a transmission unit header;

FIG. 6 is a table illustrating representative contents of a directory module;

FIG. 7 is a pictorial diagram showing the modular composition of an interactive application;

DETAILED DESCRIPTION

The invention will be described in the environment of a compressed digital transmission system, as for example a direct broadcast satellite system. It will be presumed that a single satellite transponder will have sufficient bandwidth to accommodate a plurality of respective TV programs. The respective TV programs are temporally compressed and time division multiplexed onto the single transponder.

Figure 1:
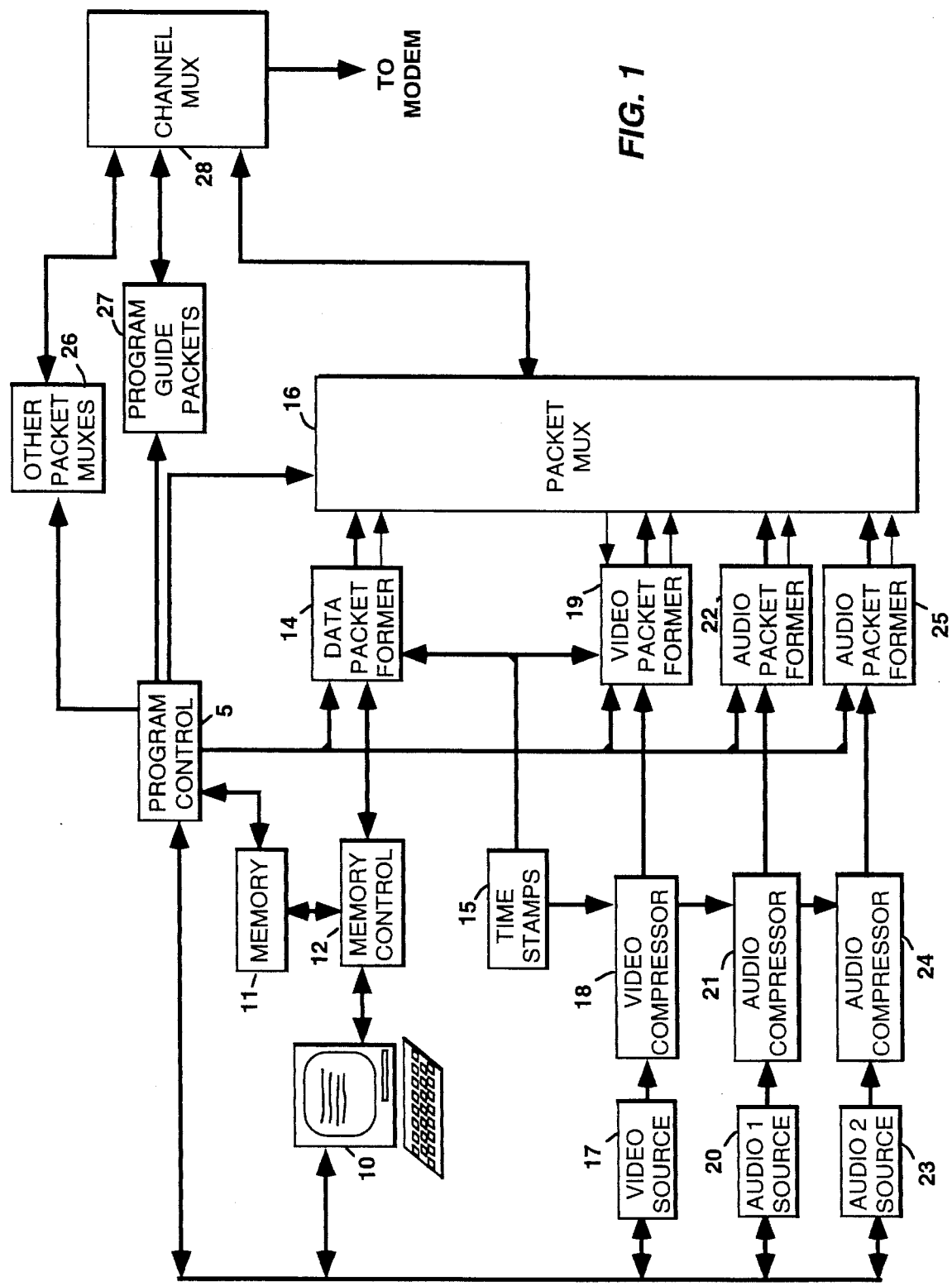
FIG. 1 is a block diagram of an interactive TV signal forming system embodying the present invention.

Referring to FIG. 1, a packet multiplexer 16 provides, at its output port, an audio-video-interactive (AVI) program. Similar such devices 26 generative alternative AVI programs. A program guide, which includes information associating the audio, video, and interactive components of respective AVI programs via SCID's, is provided in a transmission format similar to the AVI programs by a processing element 27. The program guide and respective AVI programs are applied in transport packet form to respective input ports of a channel multiplexer 28. The channel multiplexer 28 may be of known construction for equally time division multiplexing respective signals into a single signal or it may be a statistically controlled multiplexer. The output of the multiplexer 28 is coupled to a modem wherein it is conditioned for application to, for example a satellite transponder. The modem may include error coding and signal interleaving apparatus (not shown).

AVI formation is controlled by a system program controller 5. Program controller 5 may have a user interface by which particular programs and respective program signal components are selected. The program controller assigns respective SCID's for respective audio, video and interactive components of respective programs. The presumption is made that respective receivers will access a program guide to determine which SCID's associate AVI program components, and then select transport packets from the transmitted signal stream containing the associated SCID's. The audio, video and interactive components are assigned different SCID's so that one or more of the components of one AVI program may conveniently be utilized in the formation of alternate AVI programs. For example, consider that two similar TV game shows are being concurrently produced, and that it is desired that both be interactive using the same user interaction format. The same interactive component may be used simply by associating its SCID with both AVI programs, if the interactive component is substantially independent of the video program. Using Differing SCID's also facilitates editing audio from one program with video from another.

A given AVI program may include a variety of signal component sources. Shown in FIG. 1 are an interactive component source 10, a video source 17, and first and second audio sources 20 and 23 (bilingual audio). The controller 5 communicates with respective sources for time management and/or enabling functions. The source of video signal 17 is coupled to a video signal compression apparatus 18, which may compress signal according to the video compression standard promoted by the Moving Pictures Experts Group (MPEG). Similarly the respective audio signals from the sources 20 and 23 are applied to respective compression apparatus 21 and 24. These compression apparatus may compress the respective audio signals according to the audio compression standard promoted by the Moving Pictures Experts Group (MPEG). Associated audio and video signals compressed according to the MPEG protocol are synchronized with the use of presentation time stamps (PTS), which are provided by a timing element 15. For insight into how the audio and video are temporally related the reader's attention is directed to INTERNATIONAL ORGANIZATION FOR STANDARDIZATION, ISO/IEC JTC1/SC29/WG11; N0531, CODING OF MOVING PICTURES AND ASSOCIATED AUDIO, MPEG93, SEPTEMBER 1993.

The compressed audio and video signals are applied to transport packet formers 19, 22 and 25. Audio and video transport packet formers are known and will not be described. Suffice it to say that the packet formers divide the compressed data into payloads of predetermined numbers of bytes and attaches identifying headers including respective SCID's. For detailed information on a video signal transport packet former the reader is directed to U.S. Pat. No. 5,168,356. The packer formers are coupled to the packet multiplexer for time division multiplexing the respective signal components. The transport packet formers may include a buffer memory for temporarily storing packetized data to accommodate the multiplexer servicing other components. The packet formers include PACKET READY signal lines coupled to the multiplexer to indicate when a packet is available.

Interactive programs are created, via known techniques, by a programmer operating the element 10, which may be a computer or personal computer (PC). The interactive program, hereinafter application, is compiled and condensed. By condensed is meant compressed or translated to a more compact language. Respective portions of the programs are segmented into modules of different types. Modules are similar to computer files. A first type of module is a code module which comprises executable code necessary to program a computing device at a receiver to perform or execute the application. A second module type is a data module. Data modules include non-executable data used in the execution of the application. Data modules tend to be more dynamic than code modules, that is data modules may change during a program while code modules generally will not change.

A third type of module is labeled a SIGNAL. This module is a special packet able to trigger interrupts. Signals can be used to synchronize an application to, for example, a particular video frame (for action games) or to alert an application of special events (end of application, for example). Synchronization is effected via inclusion of presentation time stamps. A programmed system function is performed when the signal time video presentation time stamp matches the signal module presentation time stamp.

Figure 2:
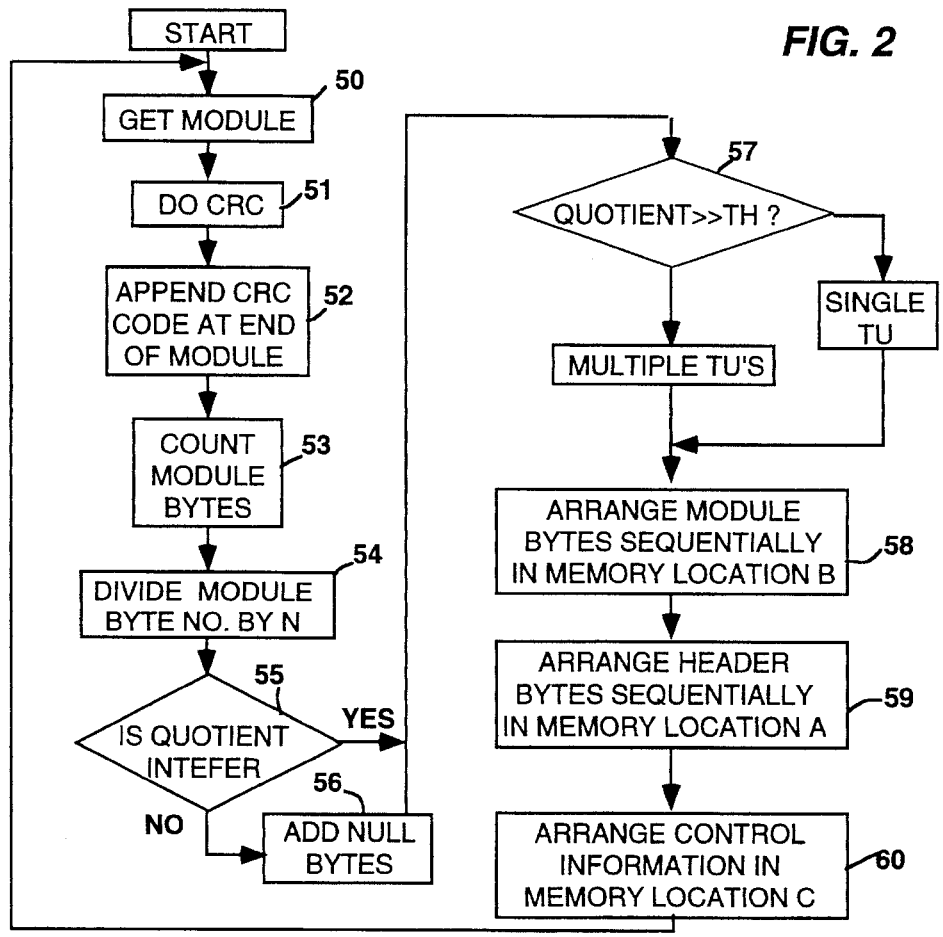
FIG. 2 is a flow chart illustrating the process of dividing the code/data bytes of a module into transmission units.
Figure 3:
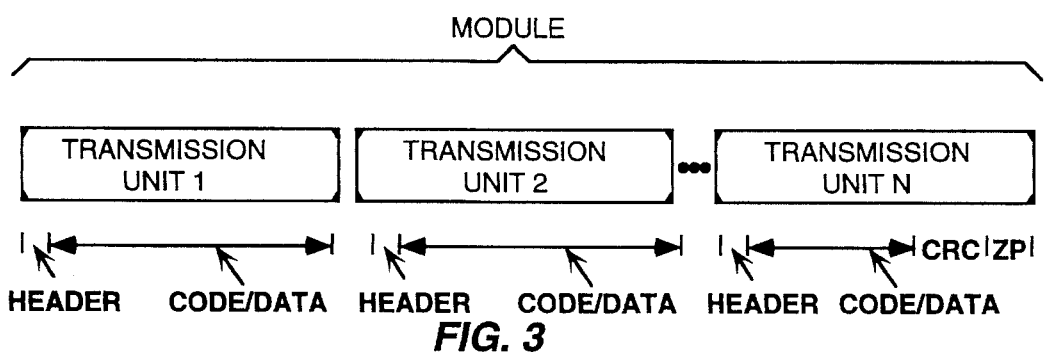
FIG. 3 is a pictorial diagram showing the composition of a module.

Once the respective modules are condensed, they are processed by the interactive component source 10 for transmission unit formation as illustrated in the flow graph of FIG. 2. The module is accessed {50} from PC memory and subjected to error encoding {51 }. Error check bits are generated and CRC check bits am concatenated or appended {52} to the end of the module data. The CRC check bits apply to the entire module, that is, in the preferred embodiment, error encoding is performed over the entire module, rather than in segments of the module. The number of bytes comprising a module are counted {53} and this number is divided {54} by a number N which is equal to the number of code/data bytes included in respective transport packets. The quotient is tested {57} to determine if the number of transport packets exceeds a threshold value representing a desired maximum number of packets per transmission unit. If the quotient exceeds the threshold, the packets will be divided into a plurality of transmission units (FIG. 3). A transmission unit (TU) consists of an integer number of transport packets (FIG. 4), one of which contains header information about the TU, and the others of which include a segment of the bytes of the module. Transmission units may contain equal or unequal numbers of transport packets. An optimum size TU has not been determined by the present inventors. However if an optimum size TU is P transport packets, then the quotient (plus 1 unit) determined in step 54 may be divided by P to establish the number of transmission units. In this instance there may be a number of TU's with P packets and a last TU with fewer packets. Alternatively the transport packets in the module may be equally divided into equal sized TU's.

A test is performed {55} to determine if the module contains an integer number of transport packets. If there are insufficient bytes in the module to fill the last transport packet, the last transport packet is zero padded {56} with null words. The condensed module is then stored {58} in the memory 11 at a predetermined memory area.

The size of a transmission unit is determined at the discretion of the application programmer. Modules are broken into transmission units because an AVI may contain alternative functional applications and thus alternative modules which may be selected by respective receiver users. Ones of these alternative modules may be relatively short. To preclude a user desirous of using a shorter program from having to wait for transmission of a longer program, the respective modules are broken into pieces (TU's) and the TU's of the different modules may be interleaved. This process can significantly lessen the time required to receive one of a number of alternative modules.

Table I, shown in FIG. 5, lists exemplary types of header information included in each TU header packet. Note that the header includes a version number. The version number is included to indicate when a change is made to the application during the presentation of the AVI. A receiver decoder can be arranged to update an executing application responsive to detecting a change in version number. The Module ID is similar to a computer file identifier and is provided by the application programmer. The Module Transmission Unit Byte Offset is a number which indicates the byte location in the module of the first code/data byte of the payload of the TU. For example if each TU includes 8 code/data transport packets, and a code/data transport packet includes 127 code/data bytes, the $i^{th}$ TU may have a Module Transmission Unit Byte Offset of 8×127×(i). The Length (bytes) Of Transmission Unit, if less than 8×127, indicates that the TU is the last TU of a module, and also indicates the location of the last code/data byte in the TU.

The TU header information of Table I is compiled by the interactive component source 10 and stored {59} in another area in the memory 11 by a memory controller 12. Information for forming a directory is also stored {60} in memory 11.

After formation of the application and processing of the modules, the interactive component source 10, under the control of the application programmer, forms a directory module which interrelates the application modules for the benefit of the receiver application hardware. Table II of FIG. 6 indicates representative types of data included in the directory module. The Directory module includes a header with an Application identifier, AID, a field which indicates the amount of memory required to store and execute the application, and a field indicating the number of modules contained in the application. The data portion of the Directory Module includes data for each module similar to the header data for the respective modules. In addition there is a string table which is a list of respective application module names in ASC11 format.

Figure 4:
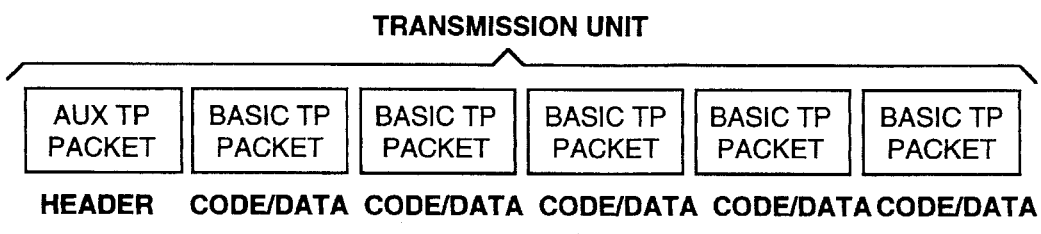
FIG. 4 is a pictorial representation of a transmission unit.

The Directory Module information is stored in a third predetermined area of the memory 11. The interactive component source 10 may be programmed to generate the actual transmission units and transport packets, however in the embodiment of FIG. 1, a separate code/data packet former 14 is included. The code/data packet former accesses the respective areas of the memory 11 through the memory controller 12 and generates packets in a sequence representing a respective application (FIG. 7). The sequence for respective modules and TU's are shown in FIGS. 3 and 4 respectively. The packets provided by the packet former 14 are coupled to the packet multiplexer 16.

Figure 8:
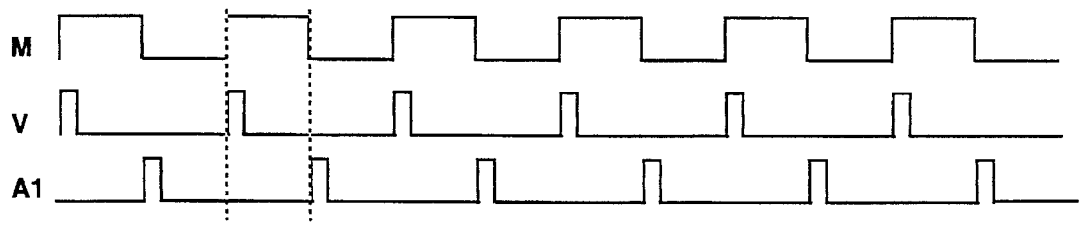
FIGS. 8 and 9 are signal waveforms representing alternative timing sequences for controlling time division multiplexing of A/V and module packets.
Figure 9:
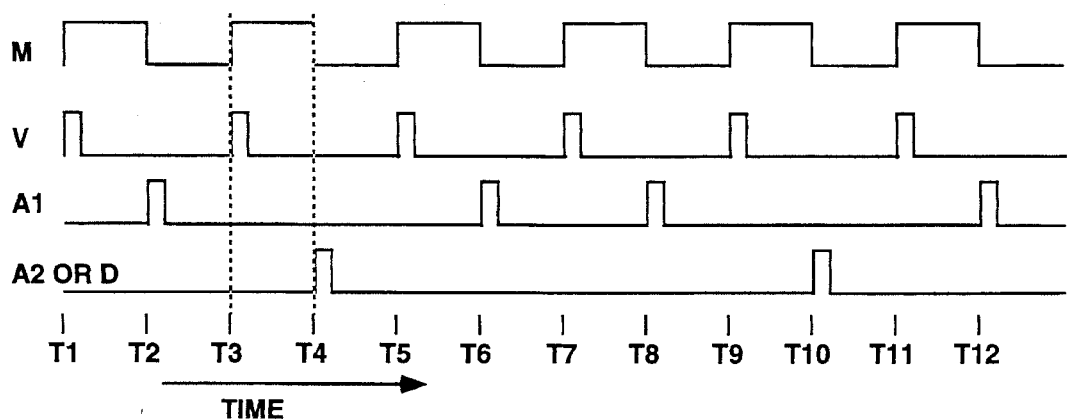
Figure 10:
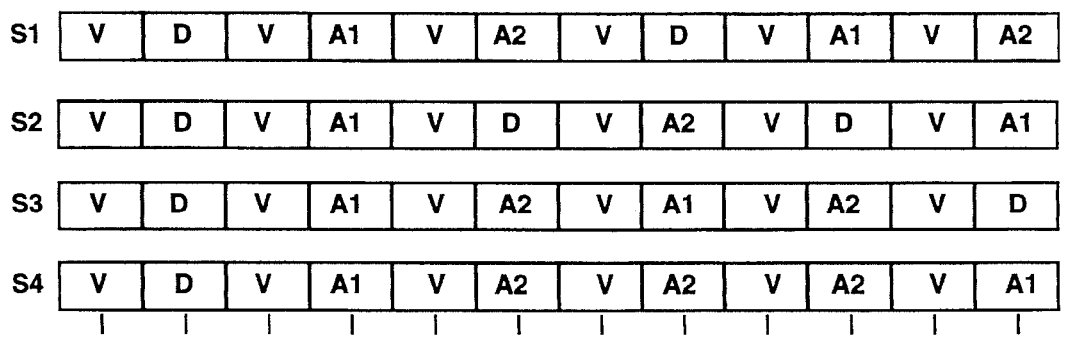
FIG. 10 is a pictorial diagram of alternative sequences of time division multiplexed A/V and module packets.

The packet multiplexer 16 is arranged to provide packets according to a particular schedule. The video component of a typical AVI program requires the largest channel bandwidth, and the multiplexer rate is determined as a function of the required video bandwidth. That is, in order to provide images at thirty frames per second requires an average minimum video packet rate of P packets per second. P is determined by the encoded image spatial resolution and image aspect ratio etc. To satisfy this requirement and to include audio and application components, the exemplary system of FIG. 1 is arranged to multiplex 2P packets a second. FIGS. 8, 9 and 10 illustrate alternative packet multiplexing formats.

The multiplexing format of FIG. 8 presumes that the program components include only a video and one audio component, as in a typical TV program. The waveform M illustrates the multiplexing rate, with one packet being passed by the multiplexer for each transition of the waveform M. The waveforms V and A1 represents the timing of multiplexed video and audio packets respectively. In this example audio and video packets alternate. It will be appreciated, however that audio packets will not traditionally occur at a rate as high as the video packets. If audio packets do not occur at the audio multiplexing rate, the multiplexer may be arranged to simply not pass an audio packet in the audio multiplex time slot, or to repeat the last audio packet. If the channel multiplexer 28 is a statistical multiplexer, it will be preferable not to pass an audio packet when an original packet is not available. This is easily arranged by causing the packet ready signal generated by the audio packet former to inhibit the multiplexer during audio packet multiplex time slots when audio packets are not available.

The multiplexing format of FIG. 9 presumes that the program components include a video component, an audio component A1, and a second audio component A2 or an interactive data component 0. In this multiplexing sequence, a video packet is passed for every second transition of the multiplexing signal M. During alternate transitions of the multiplexing signal the other two components are alternated. Video packets are passed at times T1, T3, T5, T7, T9, etc. Audio A1 is passed alternately with A2 or Data D. Audio A1 is passed at times T2, T6, T8, and T12. Audio A2 or D is passed at times T4, T10. In this sequence it has been presumed that a packet of A2 or D was not available at time T8 and the multiplexer substituted an available packet of A1. Thereafter the A1 and A2 or D packets were alternated.

Regarding the prioritization of packet multiplexing during the non-video packet multiplexing time slots, if a priority is imposed, it is preferred that the signal component with packets that occur very infrequently be assigned a higher multiplexing priority.

FIG. 10 illustrates a number of alternative component multiplexing sequences, all of which assume that video packets be passed every other packet multiplexing time slot. The sequence S1 presumes video, first and second audio and a data components. The first and second audio and the data D component packets are shown regularly alternated during even numbered time periods. The sequence S2 also presumes video, first and second audio and a data components. However in this sequence, it is assumed that the data D requires a relatively high signal bandwidth. A data packet D is indicated as being allotted every other even time period with the audio components alternating in the remaining even numbered time periods. Sequences S3 and S4 assume that the audio components require significantly more bandwidth than the data component and thus are shown to have been allotted a greater percentage of the even numbered multiplex time periods. More than one module may be concurrently transmitted. If they are transmitted concurrently, it is recommended that transport packets from TU's of different modules not be interleaved in the packet multiplexing process. However, entire TU's from different modules may be interleaved.

The specifics of the packet multiplexer 16 will not be described because multiplexing is a mature art and those skilled in digital signal processing will readily be able to design a multiplexer to satisfy their particular requirements.. Suffice it to say that the packet multiplexer 16 may be arranged using three state logic switches with input ports coupled to the respective component signals and their output ports coupled to the multiplexer output port. A state machine may be arranged to control the logic switches responsive to priorities established by the controller 5 and the respective packet ready signals provided by the packet formers.

Figure 11:
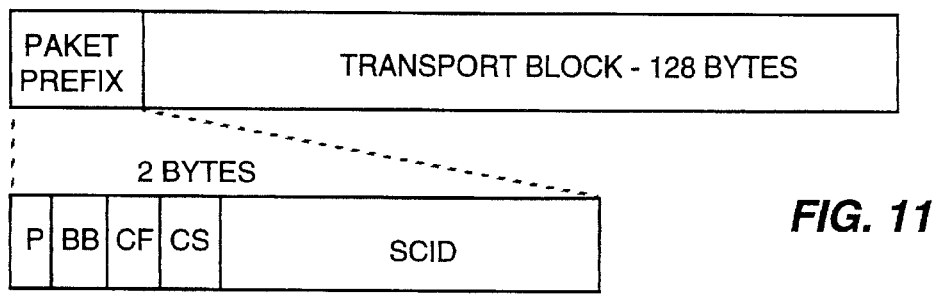
FIGS. 11, 12 and 13 are pictorial diagrams of aspects of transport packets.

FIG. 11 illustrates an exemplary form of the AVI packets. The Packets include a link layer which conveys a prefix, and a service layer or transport block which may be customized for the particular service. The prefix conveyed in the link layer is a two byte field which includes four one-bit signals P, BB, CF, CS, and a twelve-bit field for the SCID. The signals P, B B, CF, and CS are packet framing bit, a bundle boundary bit, a control flag for a packet scramble key, and control synchronization for the scramble key. Exemplary coding of the CF and CS fields is according to the relations:

| CF | CS | function |
|---|---|---|
| 0 | 0 | Use even key |
| 0 | 1 | Use odd key |
| 1 | 0 | Packet unscrambled |
| 1 | 1 | Packet unscrambled |

Figure 12:
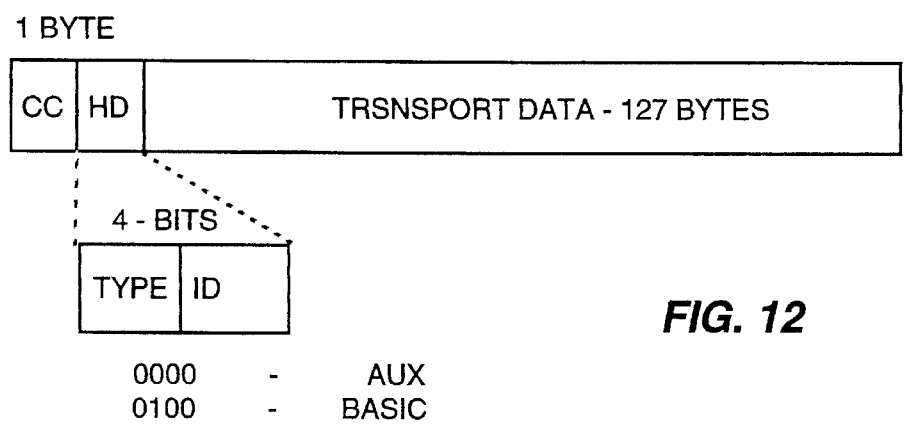

The service layer or transport block is illustrated in FIG. 12. It includes a one-byte header and a 127-byte code/data payload. The header includes a four bit field for a modulo 16 continuity count (CC) and a four bit service type identifier HD. For the interactive code/data packets two service types are utilized which are identified by the four bit HD field according to the following convention:

| | |
|---|---|
| 0000 | AUX PACKET |
| 0100 | BASIC PACKET |

Figure 13:
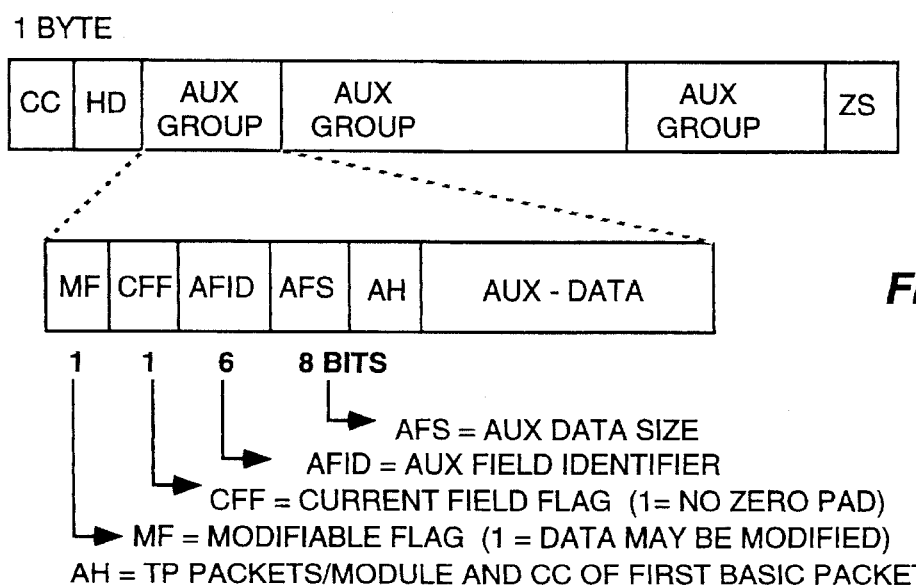

The transport block of the basic packet simply includes the HD byte followed by 127 bytes of module codewords. The basic packets are utilized to transport the codewords of respective modules, but not the transmission unit header information. The TU header data and any module header data are conveyed in auxiliary (AUX) packets. FIG. 13 illustrates the form of the service layer of exemplary AUX packets.

The AUX packet service layer includes the One-byte header with the CC and HD data. The CC value for all AUX packets is a unique value such as 0000. The remaining 127 bytes of payload are divided into one or more variable sized auxiliary groups. Each auxiliary group includes a two-byte header field containing two flags MF and CFF, an auxiliary field identifier AFID, and a number AFS indicating the amount of auxiliary data that follows in a variable length AUX data field. The flag MF indicates whether the data in the AUX data field is modifiable or not and the flag CFF indicates if the AUX data field is zero padded. One of the auxiliary groups will be arranged to convey the TU header data. This particular auxiliary group will include an additional header, AH, which contains a 16-bit field indicating the number of packets in the transmission unit and a second 8-bit field containing the CC value of the first basic packet in the transmission unit.

Figure 14:
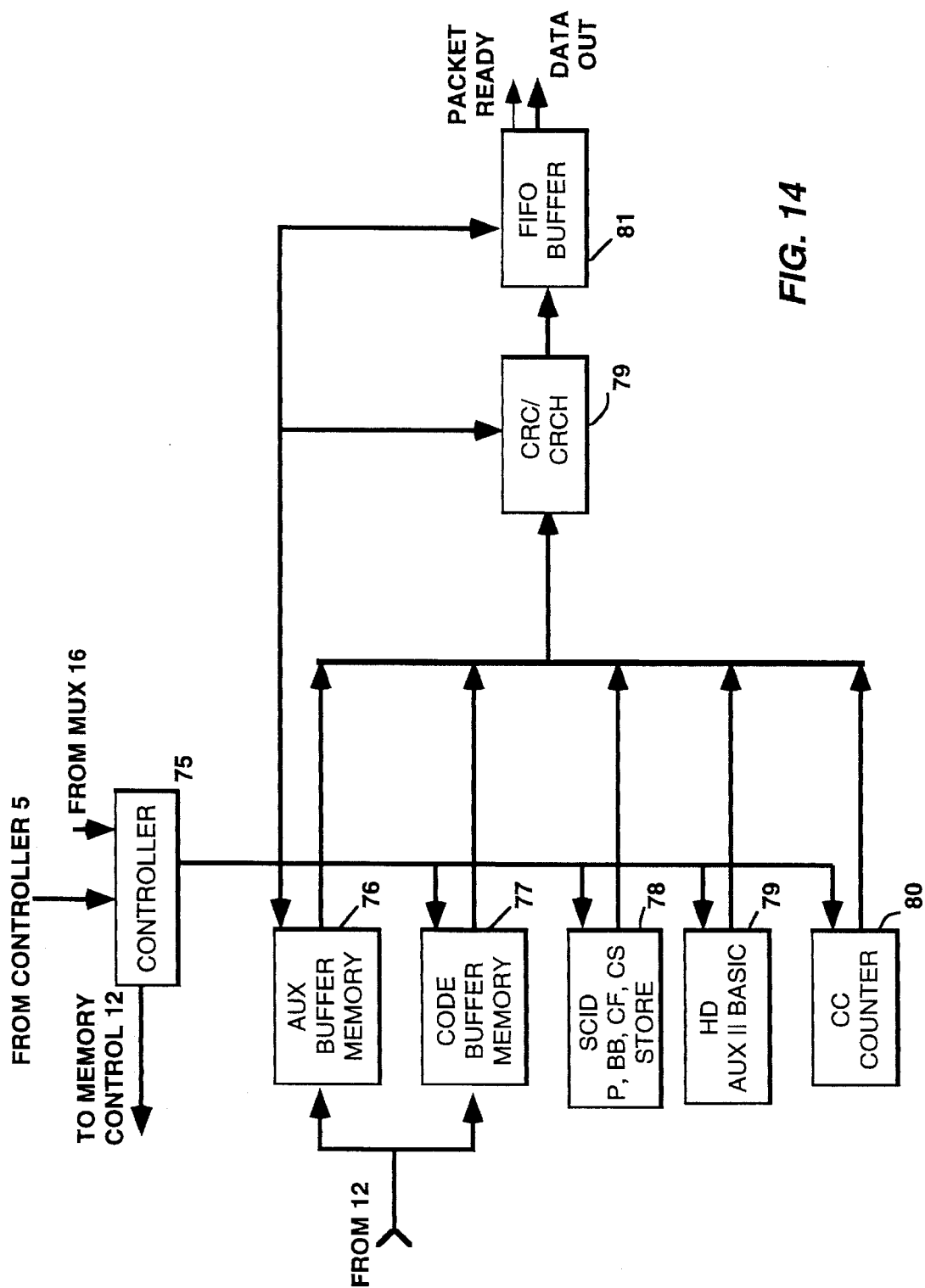
FIG. 14 is a block diagram of representative apparatus for generating code/data transport packets.

FIG. 14 shows an exemplary embodiment of a code/data transport packet former 14. The packet former includes a controller 75 which controls the functional sequencing of packet formation, and communicates with the system program controller 5, the memory controller 12 and the packet multiplexer 16. The controller 75 receives the appropriate SCID's from the program controller 5 and stores them in a storage element 78 along with other packet prefix data. The controller 75 communicates with the memory 11 via memory controller 12 to access application code/data which is then applied to one of two buffer memories 76 and 77. Header data which is to be conveyed in AUX packets is applied to the buffer 76, and data which is to be conveyed in basic packets is stored in the buffer 77. A further storage element 79 is used to store service layer header data HD, and CC counter 80 is included for completeness. Alternatively the storage elements 78 and 79 may be part of memory internal to the controller 75 and the continuity counter 80 may be realized in software in the controller 75.

Output ports of the respective elements 76–80 are realized with three state logic devices, all of which are connected to a common output bus. Packet data is accumulated in the respective elements 76–80 and applied to the output bus in a packet forming sequence under the control of controller 75.

The bus is coupled to an error coding unit 79. Error coding unit 79 generates cyclic redundancy header error check bits (CRCH) over the auxiliary group of respective AUX packets that includes the AH header and concatenates or appends the CRCH to the Aux packet. More particularly the CRCH coding is performed over the auxiliary group data field and AH header but not the auxiliary group header. The CRCH error check bits are appended to the auxiliary group. The error coding unit may also be conditioned to generate CRC error codes over information included in the service layer of basic packets, and to append or concatenate the CRC error codes to the respective basic packets. The packets are then applied to a buffer memory 81 which may be a first in first out FIFO memory. When a complete packet is stored in the FIFO 81, a packet ready signal is generated. The data output port of the FIFO and the packet ready signal are connected to the packet multiplexer 16.

Figure 15:
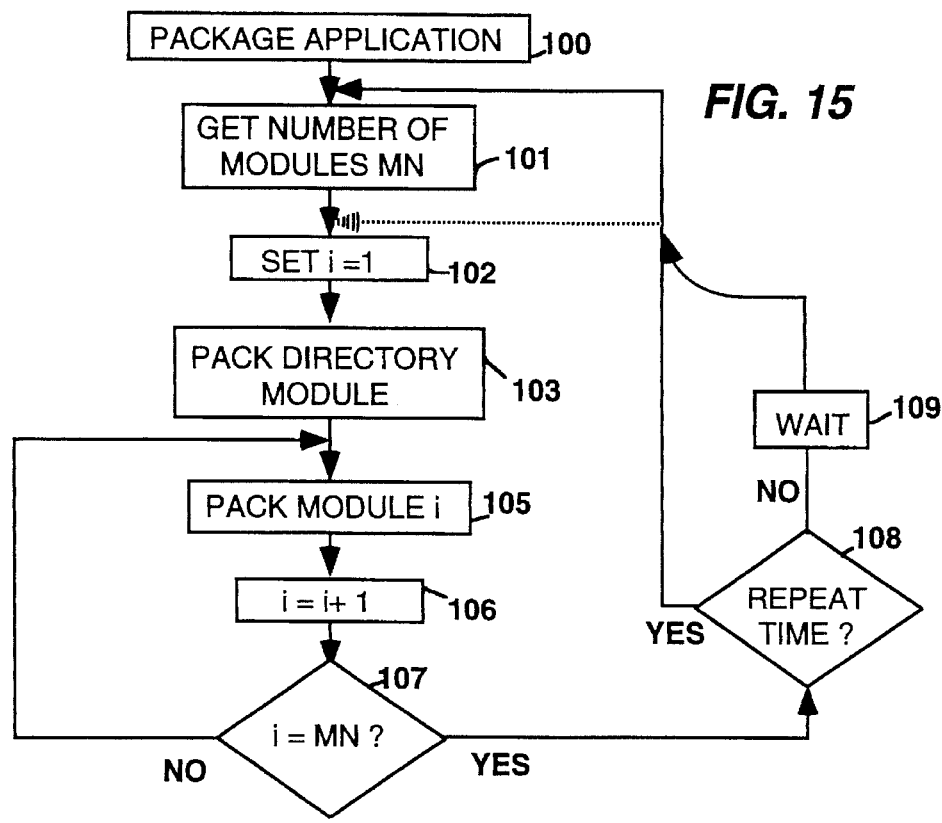
FIGS. 15, 16 and 17 are flow charts illustrating the process of forming transmission units and transport packets for respective modules.
Figure 16:
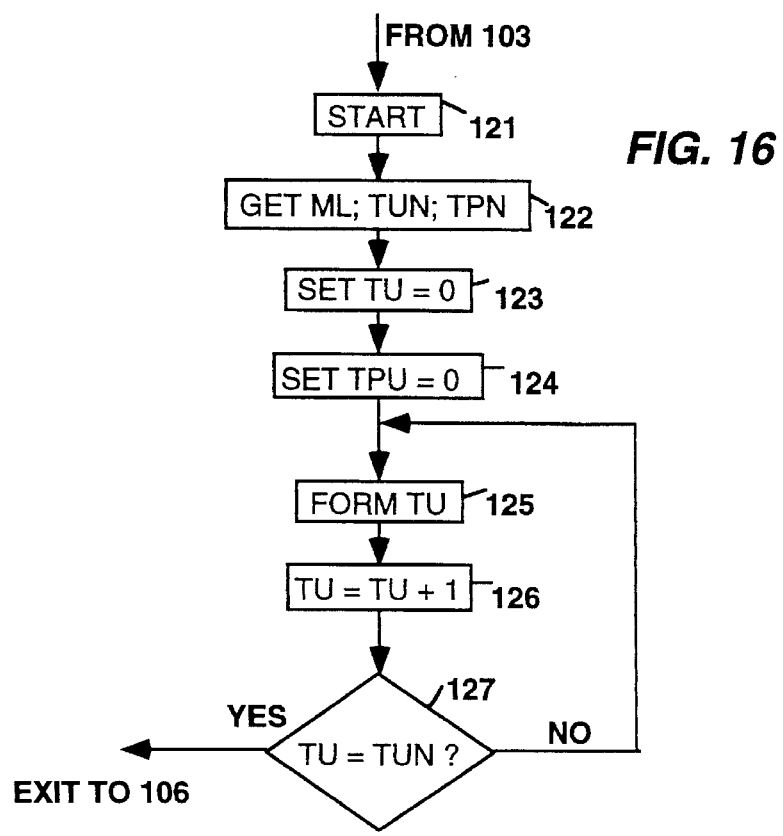
Figure 17:
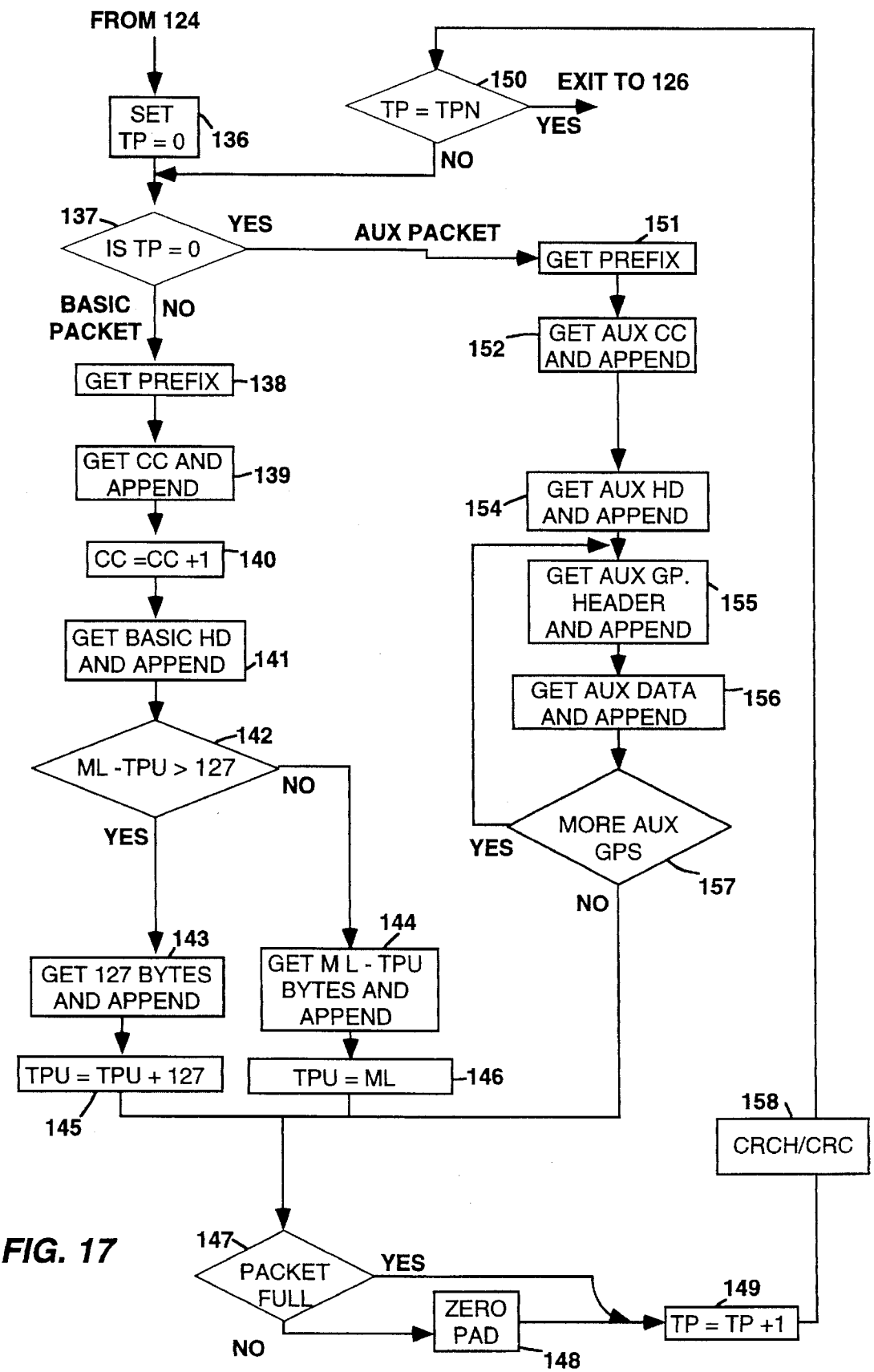

FIGS. 15, 16 and 17 are flow charts illustrating in progressively greater detail the code/data packeting process. Before discussing these flow charts several acronyms will be defined. These are:
TU=Transmission Unit;
TP=Transport Packet;
CC= Continuity Count;
TPN=Number of TP's in TU;
TUN=Number of TU's in module;
ML=Length Of Module (bytes);
TPU=Running index of bytes packeted in a TU in units of 127.

FIG. 15 illustrates the general process by which the packet former packages respective applications. Recall that the transmission media is to be utilized as application storage, thus the application will be repeatedly transmitted, i.e., packeted. The program controller initiates {100} packaging of an application. Subject to this command the controller 75 accesses {101} from memory 11, the number, MN, of modules in the current application, and the module header information, and stores same in the buffer 76. An index i is set {102} to 1. The Directory module is packeted {103}. The first application module is then packeted {105}. Index i is incremented one unit {106}, which is a count of the modules packeted. A test {107} determines if the last module of the application has been packeted. If the last module of the application has not been packeted, the system progresses to step {105} and packets the next module. On the other hand, if the last application module has been packeted, a test {108} determines if the application repeat time has elapsed. If it has, the system returns to step {101 }, or to step {102}, to begin repackaging (to retransmit) the application. Alternatively, if the repeat time has not elapsed, the system waits {109}, before repackaging the application.

FIG. 16 illustrates the module packet formation. This subroutine is initiated {121} by sourcing {122} from the buffer memory 76, the length, MN, of the module in bytes, the number, TUN, of transmission units in the module, and the number, TPN, of transport packets in the respective transmission units. A TU index is set {123} to zero and a further running total index TPU is set {124} to zero. A transmission unit is formed {125} which consists of forming a TU header AUX packet, followed by TPN-1 basic packets with application code/data. The index TU is incremented one unit {126} and tested {127} to determine if the last TU in the module has been completed. If it has not, the system progresses to step {125}. If the last TU of the module has been completed the routine is exited.

FIG. 17 shows the process {125} for TU generation. At the beginning of each TU, a Transport number index TP is set {136} to zero. The index TP is tested {137}. If the index TP is zero, a TU header AUX packet is formed {151–157}, else a basic packet is formed {138–146}. For AUX packet formation, the link layer prefix including the SCID is accessed {151 } from memory. The fixed AUX CC value is also accessed {152} and appended to the prefix. The AUX packet service layer header HD is next accessed {154} and appended after the prefix and AUS CC. An auxiliary group header is formed or accessed {155} from memory and appended after the prefix, CC and header HD. The AH header data is calculated and appended after the auxiliary group header. AUX data associated with the auxiliary group header is accessed {156} from memory and appended after the AH header. A test {157} is made to determine if further auxiliary groups are to be included in the AUX packet. If there are further auxiliary groups, the system progresses to step {155}. If not it progresses to step 147.

If a basic packet is to be formed, i.e., TP is not equal to zero, the appropriate prefix data {138} and the CC {139} are accessed from memory or the controller 75, and the CC is appended to the prefix. The CC is incremented one unit {140}. The basic packet service layer header HD is sourced and appended {141} to the CC. The index TPU is subtracted from the module length and tested {127} to determine if there are a full packets worth of module bytes remaining to be packeted. If there are, a packets worth of bytes (127 bytes in this example) are sourced {143} from the memory 77, and appended to the HD. The index TPU is incremented {145} by 127.

Alternatively, if there are less than a full packet of bytes remaining in the module, the remaining module bytes are accessed and appended {144} to the header HD. The index TPU is set to ML {146} and a packet-not-full flag is set.

After respective packets are formed, (AUX or basic) they are tested {147} to determine whether they are filled. If not they are zero padded {148} to the requisite number of bytes (127). The index TP is incremented {148} one unit. The basic packets may be optionally CRC error coded {158}, however this is somewhat duplicative of the error coding performed over the entire module. Such CRC error coding may be applied at least to the application data portion of the respective packets, and/or the service layer header (CC and HD). If a CRC is performed, the CRC error check bits will be appended to the packet data bytes.

AUX packets are CRC error coded over the auxiliary group data field and the auxiliary header AH, and CRCH error bits are appended to the auxiliary group.

The index TP is tested {150} to determine if the last packet of the TU has been processed. If not, the next packet is formed {137-149}. If it has the system exits to step 126.

The foregoing process packages modules ad seriatum. Note however that the application composer can easily arrange to interleave portions (TU's) of modules after compilation of the application; and then arrange quanta of data with indicators whether the quanta of data are to be packaged in basic or Aux packets. In this instance the packet former, responsive to such indicators will form associated data in Aux or basic packets.

Applications for AVI programs are repeatedly transmitted. The periodicity of re-transmission is determined by the programmer, and is a function of the bandwidth of the channel, the bandwidth needs of higher priority AVI components, the total data included in the application, and buffer memory size in the decoders. The re-transmission of the application may be effected by arranging the timing of the packet multiplexer to allot predetermined multiplexing periods to the application at a rate which will produce the desired application re-transmission rate.

What is claimed is:

1. Apparatus for generating an interactive audio/visual program comprising:
   a source (18) of transport packets of compressed video signal;
   a source (21) of transport packets of compressed audio signal;
   a computer (10) for generating an interactive program associated with said compressed audio and video signals, said interactive program being formed of different modules, respective said modules including executable codes or data, and including a directory module linking application modules;
   error coding means (79) for generating error check bits over respective said modules and concatenating error check bits to corresponding modules;
   transport processor apparatus (14) for packeting said modules into transport packets and grouping transport packets from respective modules into transmission units, and forming auxiliary transport packets including header information for respective transmission units;
   means (5) for assigning first identifier codes $SCID_v$, to respective video transport packets, second different identifier codes $SCID_a$, to respective audio transport packets, and third different identifier codes $SCID_D$, to respective interactive program transport packets;
   a multiplexer (16) for time division multiplexing said interactive program transport packets with said audio, and video transport packets in such fashion that said interactive program is repeated included with said compressed audio and compressed video signals.

2. The apparatus set forth in claim 1 further including error coding apparatus for independently error coding said header information for respective transmission units in said auxiliary transport packets.

3. The apparatus set forth in claim 2 wherein transmission units of more than one module may be concurrently available, and said transport processor is conditioned to interleave complete transmission units from different modules, but inhibited from interleaving transport packets from different transmission units.

4. The apparatus set forth in claim 1 wherein said transport processor is conditioned to provide said directory module, transmission units of modules of executable codes, and transmission units of modules of data in the order recited.

5. The apparatus set forth in claim 1 wherein said transport processor forms transmission units from integer numbers of transport packets, and transport packets of a transmission unit for which there is insufficient module data, are filled with null words.

6. The apparatus set forth in claim 1 further including a continuity counter for counting modulo N, (a positive integer), successive transport packets containing application module data except said auxiliary transport packets, and said transport processor including associated said successive count values in said transport packets, and including a predetermined count value in all auxiliary transport packets.

7. A method for the transmission of audio, video and interactive components of an audio-video-interactive program (hereinafter AVI) comprising:
   forming transport packets of compressed audio signal with respective packets including a payload of audio signal data and an identifier $SCID_{ai}$ for identifying the transport packet as containing audio component data;
   forming transport packets of compressed video signal with respective packets including a payload of video data and an identifier $SCID_{vi}$ for identifying the transport packet as containing video component data;
   generating an interactive application associated with the audio or video components;
   segmenting the interactive application into modules similar to computer files, respective modules containing executable codes or application data;
   dividing respective modules into one or more transmission units including integer numbers of transport packets, each transport packet including an identifier $SCID_{Di}$ for identifying the transport packet as containing interactive component data;

generating a further transport packet for respective transmission units, said further transport packet including transmission unit header information describing the information contained in the respective transmission unit; and time division multiplexing the audio, and video component packets with interactive component packets, said interactive component packets in transmission unit sequence with respective transmission units headed by said further transport packet.

8. The method set forth in claim 7 wherein said $SCID_{Di}$, $SCID_{ai}$, and $SCID_{vi}$ are different values.

9. The method set forth in claim 7 wherein said further packet is an auxiliary transport packet and the method of generating an auxiliary transport packet includes:

providing said $SCID_{Di}$, a predetermined fixed continuity count value CC, and an auxiliary packet type data-word HD, and concatenating the count value CC and the auxiliary packet type data-word HD, to the identifier $SCID_{Di}$;

generating an auxiliary group including an auxiliary group data field and an auxiliary group header, said auxiliary group header including a codeword AFID identifying data included in said auxiliary group data field, and a field AFS indicating the number of bytes of data in said auxiliary group data field, and concatenating the auxiliary group header to said $SCID_{Di}$, CC and HD data; and including said transmission unit header information in said auxiliary group data field.

10. The method set forth in claim 9 wherein the method of generating an auxiliary transport packet further includes:

generating further auxiliary group header fields, AH, including a first field which indicates the number of transport packets in the corresponding transmission unit, and a second field indicating the continuity count value of the first transport packet of a transmission unit after the occurrence of said auxiliary transport packet.

11. The method of claim 7 further comprising the step of interleaving whole transmission units of different modules exclusive of interleaving respective transport packets of different transmission units.

12. The method set forth in claim 7 further including;

forming a directory module which includes data indicating the modules included in an application;

forming the directory module into a transmission unit and transport packets; and time division multiplexing the directory module with the audio, and the video component packets before multiplexing modules of said interactive application.

13. The method set forth in claim 12 further including repeatedly multiplexing transmission units of said directory module and said application modules, with said audio and video components, as an AVI program.

14. The method set forth in claim 7 further including error coding each said module and concatenating error check bits to each such module.

15. The method set forth in claim 9 further including error coding each said module and concatenating error check bits to each such module.

16. The method set forth in claim 15 further including error coding at least the auxiliary group data field and said header AH in said auxiliary transport packet and concatenating error check bits to said auxiliary group.

17. The method set forth in claim 9 further including error coding at least the auxiliary group data field and said header AH in said auxiliary transport packet and concatenating error check bits to said auxiliary group.

18. A method of transmitting interactive audio-video information comprising:

providing packets of compressed audio and video signal components;

generating an interactive program including executable files, data files, and a directory file which interrelates said executable and data files;

error coding at least respective said executable files and concatenating error check bits to corresponding files;

packeting respective files with error check bits concatenated into transport packets of predetermined amounts of data, and forming one or more transmission units of respective files of data, respective transmission units including a first packet containing transmission unit header data descriptive of the transmission unit, and a further integer number of transport packets including data from one of said executable, data or directory files; and time division multiplexing transport packets of said transmission units with packets of compressed audio and video signal components for transmission, wherein respective ones of said transmission units are repetitively multiplexed with non repeated said packets of compressed audio and video signal components.

19. The method set forth in claim 18 wherein respective transport packets of file data include a sequential continuity count value, and the step of forming said first packets includes:

determining the number of transport packets in a respective transmission unit;

determining the continuity count value of the first transport packet containing file data in the transmission unit;

determining a version number for the corresponding file;

determining the position of file data in a transmission unit relative to the normal sequence of total file data;

arranging said number, said continuity count value, said version number, and said position as a transmission unit header; and error coding said transmission unit header.

20. A method for transmitting executable programs on an audio/video transmission medium, comprising:

generating an application using a computer apparatus;

segmenting the application into modules similar to computer files, respective modules containing executable codes or application data;

dividing respective modules into one or more transmission units including integer numbers of transport packets, respective transport packets including information for identifying such transport packets as containing application data;

generating a further transport packet for respective transmission units, said further transport packet including transmission unit header information describing the information contained in the respective transmission unit; and applying said respective and said further transport packets to an audio/video transmission medium.

21. The method set forth in claim 20 further including the steps of:

error coding at least said respective modules containing executable codes; and concatenating error codes, generated in said error coding, to corresponding modules.

22. The method set forth in claim 21 further including the step of interleaving transport packets of ones of said transmission units.

* * * * *